W. H. McDONALD.
INSECT TRAP.
APPLICATION FILED JUNE 28, 1910.
1,005,567.
Patented Oct. 10, 1911.
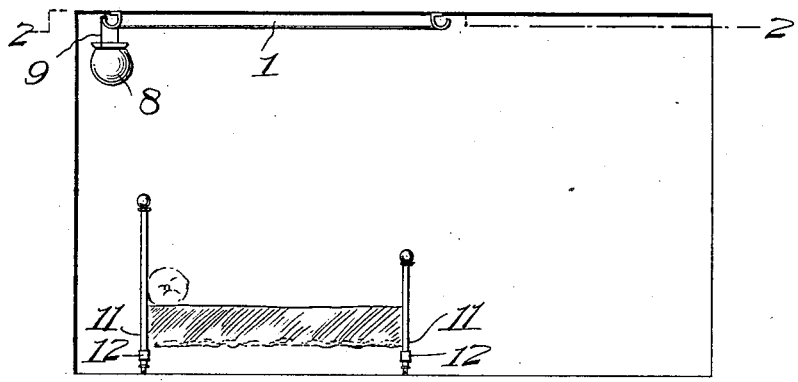
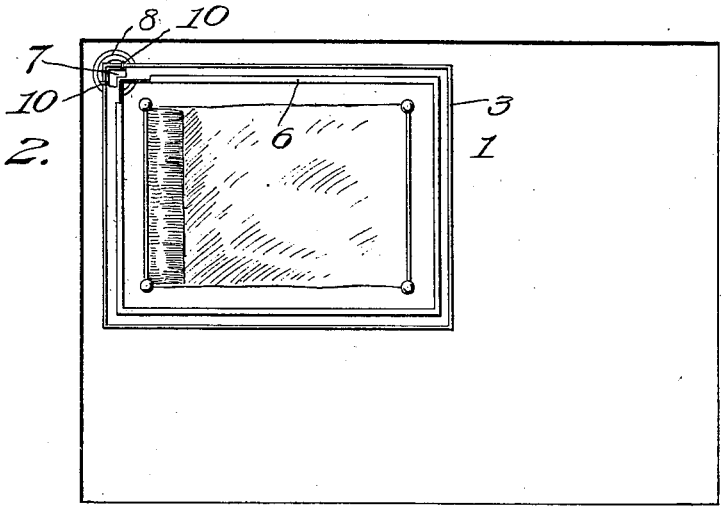
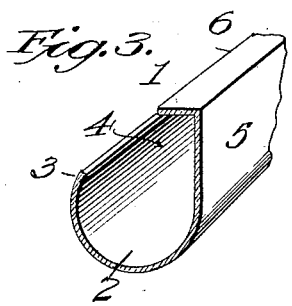
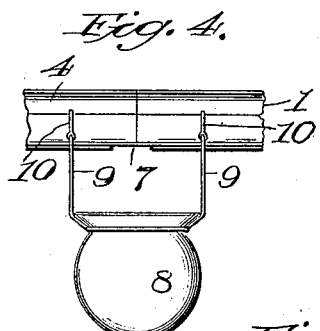
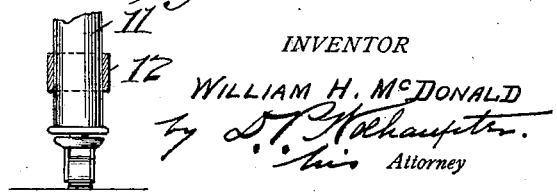
WITNESSES
INVENTOR
WILLIAM H. McDONALD
Attorney

UNITED STATES PATENT OFFICE.

WILLIAM H. McDONALD, OF OVERTON, NEVADA.

INSECT-TRAP.

1,005,567.  Specification of Letters Patent. Patented Oct. 10, 1911.

Application filed June 28, 1910. Serial No. 569,413.

*To all whom it may concern:*

Be it known that I, WILLIAM H. McDONALD, a citizen of the United States, residing at Overton, in the county of Clark and State of Nevada, have invented certain new and useful Improvements in Insect-Traps, of which the following is a specification.

This invention relates to the subject of insect traps, and more particularly to that class of traps designed for catching those insects which infest dwelling houses.

To this end the invention has in view a simple and practical form of insect trap possessing special utility as an inconspicuous and effective means of entrapping the chinch bug, commonly termed the bed bug, which is a source of great annoyance to the house keeper and which is commonly found in bedding, in and about the bed frame, as well as finding lodgment behind the wall paper and the moldings and picture frames about a room. It is, therefore, the particular purpose of the present invention to provide a novel means for entrapping the chinch or bed bug within the rooms of a dwelling either on the walls, ceilings, floors, or at any other advantageous point where it may be desired to locate the trap.

The present invention contemplates an insect trap designed with special reference to, and recognition of, the habits and crawling possibilities of insects of the kind referred to, and in this same connection is also useful as a trap for insects such as ants, roaches, and lice.

With these and other objects in view, which will more readily appear as the nature of the invention is better understood, the same consists in the novel construction, combination and arrangement of parts hereinafter more fully described, illustrated and claimed.

While the invention is susceptible to modification in various forms, and to various modes of application, certain preferred and practical embodiments thereof are shown in the accompanying drawings, in which,—

Figure 1 is a diagrammatic section of a bed room illustrating the invention applied to the ceiling thereof to protect the bed from the insects dropping thereon from the ceiling, which is a more frequent occurrence than the bug gaining access to the bed by crawling up the legs thereof. Fig. 2 is a horizontal sectional view on the line 2—2 of Fig. 1, which view in effect is a top plan view of the trap applied to the ceiling and showing its relation to the bed therebelow to provide a protected zone therefor. Fig. 3 is an enlarged cross sectional view of the preferred shape of the trough-like body of the trap. Fig. 4 is a detail view illustrating a method of arranging a collecting receptacle for the entrapped insects, which are caught in, and guided by, the trap body. Fig. 5 is a detail view showing a supplementary insect guard, embodying the broad principle of the invention and which may be used as a part of the general system of protection in the application of the invention shown in Fig. 1.

Like references designate corresponding parts in the several figures of the drawings.

In carrying out the present invention, the improved design of trap has been constructed with special regard to the habits and crawling possibilities of the bed bug and insects of like variety, and therefore the same principles of construction and function prevail in any and all forms of the invention, and in any and in all uses thereof. In this connection it may be observed that by careful study and observation, it has been found that it is utterly impossible for a bed bug to ascend or crawl upward upon smooth hard surfaces such as presented by smooth or polished metal or by vitreous surfaces, such as glass. Hence, taking this into consideration, the improved trap primarily consists of a trap body designated in its entirety by the reference number 1, and as best seen in Fig. 3 of the drawings. This trap body, in cross section, consists of a hollow beading which may be constructed in strip form and of any suitable material presenting smooth interior surfaces on which the insects cannot crawl upward. As shown in Fig. 3 of the drawings, this hollow beading is made from a strip of sheet metal bent into tubular form to provide an interior trapping gutter 2, an upstanding entrance wall 3, that is, a wall over the upper edge of which is provided space 4 to admit the insects into the trap, and an upstanding side wall 5 forming the attaching wall for supporting the beading on the wall or other point of support, and to facilitate this mounting of the beading, the said wall 5 may be provided at its upper edge with a securing flange 6 for the reception of suitable fastening means for holding the device in place.

In all uses of the invention, the interior of the beading 1 is polished or smooth so that when the insects once fall therein, they can only follow the longitudinal trend of the trap body, through the bottom thereof, to a point where they may or may not be collected in a separate receptacle.

In the application of the invention shown in Figs. 1, 2 and 4 of the drawings, the beading constituting the trap body is shown as being arranged in strips of sufficient length and joined at their ends into a continuous communicating trap frame fastened to the ceiling of a room above a bed set out from the wall and thus serving to entrap the insects which crawl up the walls and out on to the ceiling, thereby providing a protected zone for the bed. In connection with this system, the trap frame may be provided at a suitable point with an escape opening 7 through which the entrapped insects drop into a collecting receptacle 8 suspended from the trap frame by means of hangers which may be conveniently hooked onto the wall 3 as at 10. Also, as a part of the arrangement described, the legs 11 of the bed may be provided with insect guards 12 in the form of smooth bands upon which the insects cannot crawl upward.

Other uses and applications of the invention will be readily apparent without further description.

I claim:

An insect trap comprising a trap frame adapted to be secured to the ceiling of a room and consisting of a framework of communicating trough shaped beading depending from the ceiling and having a top trapping opening for the insects, and also provided with a smooth interior surface and a single escape opening, and a supplementary collecting receptacle suspended from the frame beneath said opening.

In testimony whereof I hereunto affix my signature in the presence of two witnesses.

WILLIAM H. McDONALD.

Witnesses:
E. H. PARKINS,
EMORY L. GROFF.

---

Copies of this patent may be obtained for five cents each, by addressing the "Commissioner of Patents, Washington, D. C."